United States Patent Office 3,326,016
Patented June 20, 1967

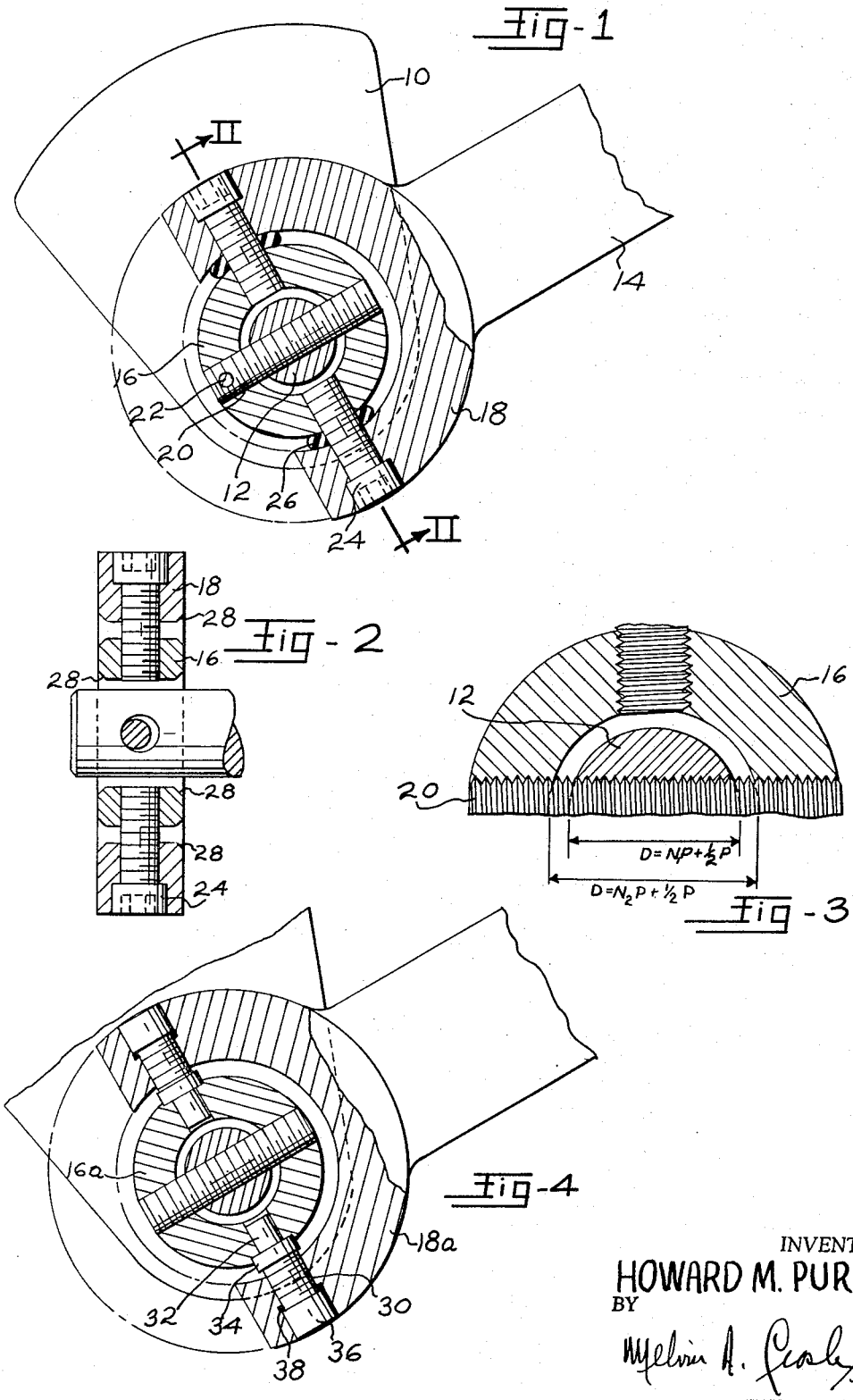

3,326,016
FLEXIBLE JOINT
Howard M. Purcell, South Euclid, Ohio, assignor, by mesne assignments, to Ashtabula Bow Socket Company, Ashtabula, Ohio, a corporation of Ohio
Filed June 28, 1965, Ser. No. 467,337
2 Claims. (Cl. 64—18)

The present invention relates to flexible joints of the universal type and is particularly concerned with a flexible joint of this nature having great strength but being simple, economically to manufacture, and particularly adapted for use where a high degree of flexibility is not required.

Universal joints are employed in many situations for obtaining flexibility between a pair of members to compensate for misalignments or for manufacturing tolerances or the like. In the present case, a motor is provided having a rotary or oscillatory output shaft which is arranged for actuating an arm and the arm is connected to the shaft by means of a flexible joint according to the present invention. More specifically, the motor is in the form of a paddle motor having an output shaft which shaft is connected to the arm of a convertible automobile top, the said motor being mounted in the body toward the back of the top. With such an arrangement, it is essential to provide some flexibility between the shaft and the arm because no close manufacturing tolerances are held in this type of construction and lateral movement of the arms during their travel from retracted position to forward position will always occur.

It is in connection with a flexible universal joint particularly adapted for connecting such an arm to a motor output shaft that the present invention is concerned. Such a universal joint must be inexpensive, easy to manufacture and assemble, relatively strong, and free from lost motion which could induce rattling and wear. The present invention proposes the provision of a universal joint consisting, basically, of an inner ring surrounding the shaft and an outer ring or yoke embracing the inner ring with at least the means connecting the inner ring to the shaft taking the form of a threaded element such as an elongated screw or bolt.

The nature of the present invention will be more clearly understood upon reference to the following specification taken in connection with the accompanying drawings, in which:

FIGURE 1 is a view partly in section showing a paddle motor and an arm driven thereby and a flexible joint according to the present invention interconnecting the arm and the output shaft of the paddle motor;

FIGURE 2 is a sectional view indicated by line II—II on FIGURE 1;

FIGURE 3 is a fragmentary view drawn at somewhat enlarged scale showing details in connection with the flexible joint; and FIGURE 4 is a view similar to FIGURE 1 but showing a modified construction of the flexible joint.

Referring to the drawing somewhat more in detail, 10 represents a paddle motor having an output shaft 12 which oscillates, due to the operation of the paddle motor, between predetermined limits. The said oscillation may be less than 90° or it may be as much as almost 180°. The shaft is provided for driving arm 14 which forms a part of the structure of a collapsible automobile top. The arm is in one position when the top is collapsed and by driving the arm to another position, the top can be moved to its raised position while the arms, or links connected thereto in some manner, engage fastening means toward the front of the automobile passenger compartment, usually at the top side edges of the windshield region. Due to the nature of automobiles, it is almost certain to be the case that the arms 14 will have to swing laterally with respect to the plane of movement thereof between their retracted and advanced positions. If the arm 14 is fixedly connected to shaft 12, undue load would be placed on the connection between the arm and shaft, and on the shaft, and on the shaft bearing means and on the motor 10 which would lead to rapid wear thereof or defective operation of the entire structure. By providing a flexible joint according to the present invention, no such load is placed on the shaft or motor while the arm 14 is permitted some lateral movement.

In FIG. 1 the flexible joint takes the form of an inner ring 16 surrounding shaft 12 with small clearance therefrom and substantially concentric with the shaft. Positioned about ring 16 is an outer ring or yoke 18 substantially concentric with ring 16 and having small clearance therefrom. Yoke 18 is welded to the end of arm 14.

For connecting ring 16 to shaft 12 there is provided a screw or bolt or length of threaded rod 20 which is threaded through shaft 12 diametrally thereof and also through both sides of ring 16. For permitting a threaded rod to be inserted through the ring and shaft in this manner, the shaft and ring, of course, have the same thread formed therein but, in particular, both sides of the ring are threaded in a single threading operation. This will insure that the thread on one side of the ring is a continuation of the thread on the other side of the ring so that threaded member 20 will properly engage both thereof when the ring 16 is assembled with shaft 12.

Threaded member 20 may have a head thereon to lock it to ring 16, or it may project from ring 16 on the open side of the yoke and have a lock nut thereon, or other means may be provided for fixing threaded member 20 in place in ring 16, such as the lock pin 22 illustrated in FIG. 1. In any case, the threads of member 20 provide a large bearing area for shaft 12 and ring 16 so that the connection of ring 16 to shaft 12 remains snug and does not easily become loose and will not wear rapidly while, at the same time, ring 16 can tilt relative to shaft 12 about the axis of member 20.

The ring 16 is also adapted for receiving the threaded screws 24 which are positioned on an axis at right angles to the axis of member 20 and which screws 24 are threaded through the legs of yoke 18 and through opposite sides of ring 16. The axis of the screws 24 is preferably, but not necessarily, at right angles to the length of arm 14 as well as to the axis of threaded member 20. The screws 24 also establish a strong load transmitting connection between ring or yoke 18 and ring 16 which will wear only slightly and which will carry heavy loads but which will nevertheless permit ring 18 to tilt relative to ring 16 about the axis of screws 24. Rubberlike grommets 26 may be introduced between ring 16 and yoke 18 in surrounding relation to screws 24, if so desired to prevent rattling, but the use of the grommets is rarely necessary and, because of assembling difficulties are seldom used. FIGURE 2 shows the unit without grommets.

As in the case of the threaded holes in ring 16 for receiving threaded member 20, the holes in ring 16 for receiving screws 24 are also both threaded in one single operation so that the thread on one side of the ring forms a continuation of the thread on the other side of the ring. Similarly, the threaded portions of the holes in yoke 18 are threaded in one single operation and these threads also, therefore, form continuations of each other. In this manner it is insured that the screws 24 will radially thread through both yoke 18 and ring 16 and hold the two firmly but tiltably together in the proper relative positions.

A feature of the present invention is illustrated in FIG. 3. This feature concerns the substantial centering of shaft 12 inside ring 16. It will be evident that, inasmuch as ring 16 and shaft 12 are threaded independently of each other, there could be substantial lack of concentricity thereof up to the extent of one pitch length of the threaded member 20. However, by selecting the pitch length of threaded member 20 and the diameter of shaft 12 and the inside diameter of ring in a certain manner, substantially exact alignment of ring 16 on shaft 12 can be accomplished. This is done by starting a screw through one side of ring 16 and into shaft 12 and if the misalignment of the shaft and ring exceeds a predetermined amount, ring 16 can be turned 180° and the threaded member then threaded through the ring and shaft. In this manner the displacement of the center of shaft 12 from the center of ring 16 is never in excess of one-half the pitch length of the thread on threaded member 20.

By forming the threads for screws 24 the same size as the threads for threaded member 20, still further possibilities of minimizing the eccentricity of ring 16 and shaft 12 are presented. From the foregoing it will be seen that the inside diameter of ring 16, and the outside diameter of shaft 12, according to the present invention differs from a predetermined multiple of the pitch length of member 20 by one-half a pitch length. This will permit the fine adjustment of ring 16 relative to shaft 12 above referred to.

As will be seen in FIG. 2, ring 16 as well as yoke 18 is advantageously provided with beveled regions 28 which will permit ring 16 closely to surround shaft 12 and yoke 18 closely to embrace ring 16 while still permitting the desired amount of tilting movements of the members relative to each other, said desired degree of tilting movement amounting to about 6–10° of freedom of movement of arm 14 in the lateral direction thereof.

In FIG. 4 a slightly modified arrangement is shown and wherein corresponding parts bear corresponding numerals with the addition of a subscript $a$. In FIG. 4, however, in place of screws 24 threaded through both yoke 18 and ring 16 there are provided shoulder screws 30 which thread through yoke 18$a$ and which have turned ends 32 disposed in smooth bores in ring 16$a$. Washers or collars 34 are abutted on one side by the shoulders of screws 30 and on the other side abut opposite sides of ring. The screws 30 have heads 36 that are received in counterbores in yoke 18$a$ and between the bottoms of the counterbores and the undersides of heads 36 are disposed resilient friction elements 38 which will serve to lock the screws 30 in position in yoke 18$a$ while still permitting the screws to be adjusted to such position that there is no lost motion between ring 16$a$ and yoke 18$a$ in the direction of the axis of screws 30. In all other respects, the construction of the FIG. 4 arrangement is the same as that previously described.

The reverse of the FIG. 4 construction is also contemplated, namely, where the bores in ring 18 are free of threads while ring 16 is threaded to receive the screws corresponding to screws 30. The screws, as before, would be locked in place tightly by pins, lock washers, or by set screws.

It will be understood that in the drawings the clearance between the several members making up the entire universal joint has been exaggerated to clarify the showing of the present invention. The members can actually fit closely together since the joint has only to accommodate movement of about 10° or less of arm 14.

It will be understood that this invention is susceptible to modification in order to adapt it to different usages and conditions; and accordingly, it is desired to comprehend such modifications within this invention as may fall within the scope of the appended claims.

What I claim is:

1. A flexible joint for connecting an oscillatory shaft with an arm to be moved thereby in a plane substantially normal to the axis of the shaft and comprising; a first ringlike member surrounding said shaft and having at least slight clearance therefrom, first threaded means having external threads formed thereon, first internally threaded aperture means formed on opposite sides of said first ringlike member, second internally threaded aperture means extending through said shaft, said first threaded means being disposed in said first and second aperture means and extending completely through said first ringlike member and said shaft and tiltably interconnecting the first ringlike member and the shaft, a second ringlike member fixed to said arm and embracing said first ringlike member with at least slight clearance therefrom, screws threaded through said second ringlike member and having end portions extending into said first ringlike member, said screws being located on an axis extending substantially at right angles to the axis of said first threaded means, the threads defining the internally threaded aperture means on opposite sides of said first ringlike member being continuations of each other, and the inner diameter of said first ring member and the outer diameter of said shaft being equal to a whole multiple of the pitch of the thread of said first threaded means plus one-half pitch length thereof.

2. A flexible joint for connecting an oscillatory shaft with an arm to be moved thereby in a plane substantially normal to the axis of the shaft and comprising; a first ringlike member surrounding said shaft and having at least slight clearance therefrom, first threaded means having external threads formed thereon, first internally threaded aperture means formed on opposite sides of said first ringlike member, second internally threaded aperture means extending through said shaft, said first threaded means being disposed in said first and second aperture means and extending completely through said first ringlike member and said shaft and tiltably interconnecting the first ringlike member and the shaft, a second ringlike member fixed to said arm and embracing said first ringlike member with at least slight clearance therefrom, third internally threaded aperture means formed in said second ringlike member, fourth internally threaded aperture means formed in said first ringlike member, screws threaded through said third aperture means in said second ringlike member and having end portions threaded into said fourth aperture means in said first ringlike member, said screws being located on an axis extending substantially at right angles to the axis of said first threaded means, the threads defining the first threaded aperture means forming a continuation thereof and the threads defining the third and fourth aperture means forming a continuation of one another.

References Cited

UNITED STATES PATENTS

| | | | |
|---|---|---|---|
| 666,406 | 1/1901 | Bocorselski | 64—17 |
| 893,281 | 7/1908 | Teal | 64—18 |
| 1,216,508 | 2/1917 | Spade | 64—18 |
| 1,836,706 | 12/1931 | Davis | 64—22 |
| 2,039,912 | 5/1936 | Leighton | 287—100 |
| 2,175,398 | 10/1939 | Leighton | 287—100 X |
| 2,428,086 | 9/1947 | Leighton | 287—100 X |
| 3,052,396 | 9/1962 | Butscher | 64—18 X |
| 3,064,453 | 11/1962 | Barsness et al. | 64—18 |

FRED C. MATTERN, Jr., *Primary Examiner.*

HALL C. COE, *Examiner.*